US006778336B2

(12) United States Patent
Tracy

(10) Patent No.: US 6,778,336 B2
(45) Date of Patent: Aug. 17, 2004

(54) REDUCED VISIBILITY SURFACE

(75) Inventor: Richard J. Tracy, Elgin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/632,544

(22) Filed: Aug. 1, 2003

(65) Prior Publication Data

US 2004/0095650 A1 May 20, 2004

Related U.S. Application Data

(60) Provisional application No. 60/400,962, filed on Aug. 2, 2002.

(51) Int. Cl.$^7$ .................. G02B 13/20; G02B 13/18; G02B 5/04; G02F 1/1335; B32B 3/00
(52) U.S. Cl. .................. 359/707; 359/615; 359/708; 359/709; 349/113; 428/172
(58) Field of Search ................... 359/707, 708, 359/709, 710, 711, 712, 608, 599, 615, 616; 349/113; 428/172

(56) References Cited

U.S. PATENT DOCUMENTS

| 4,431,266 A | 2/1984 | Mori et al. ............ 350/167 |
|---|---|---|
| 4,756,603 A | 7/1988 | Ohtani ................ 350/276 R |
| 5,212,596 A | 5/1993 | Andrus ................... 359/614 |
| 5,763,049 A * | 6/1998 | Frey et al. ............. 428/172 |
| 5,861,990 A * | 1/1999 | Tedesco ................. 359/599 |
| 5,919,551 A | 7/1999 | Cobb, Jr. et al. ........ 428/156 |
| 6,199,989 B1 | 3/2001 | Maeda et al. ........... 359/613 |
| 6,456,437 B1 | 9/2002 | Lea et al. .............. 359/625 |
| 6,502,943 B2 | 1/2003 | Nakamura et al. ....... 359/603 |
| 6,528,142 B2 | 3/2003 | Ikegaya et al. ......... 428/141 |
| 2002/0094417 A1 | 7/2002 | Phillips ................ 428/172 |
| 2002/0097496 A1 | 7/2002 | Lu ...................... 359/628 |
| 2002/0163728 A1 | 11/2002 | Myers .................. 359/613 |
| 2003/0063387 A1 | 4/2003 | Miyazaki et al. ....... 359/613 |
| 2003/0076596 A1 | 4/2003 | Miyatake et al. ....... 359/601 |

FOREIGN PATENT DOCUMENTS

| WO | WO 89/06338 | 7/1989 |
|---|---|---|
| WO | WO 98/59266 | 12/1998 |

* cited by examiner

Primary Examiner—Tim Thompson
(74) Attorney, Agent, or Firm—Mark W. Croll; Paul F. Donovan

(57) ABSTRACT

A surface configuration obscures an object from detection by night vision devices, ultraviolet devices and infrared devices. The surface configuration is three dimensional, having spaced inner and outer surfaces. A wall defines a plurality of enclosed cells, and projections extend from the inner surface within the cells. The cells can be hexagonal, round or otherwise shaped. The projections can be flat sided or curved.

27 Claims, 1 Drawing Sheet

REDUCED VISIBILITY SURFACE

CROSS REFERENCE TO RELATED APPLICATIONS

The present invention claims benefit to U.S. Provisional Application Serial No. 60/400,962 filed on Aug. 2, 2002.

FIELD OF THE INVENTION

The present invention relates generally to camouflaging surface treatments and, more particularly, the invention relates to surfaces having reduced visibility to night vision devices and other vision enhancing devices.

BACKGROUND OF THE INVENTION

The use of enhanced night vision devices is growing ever more common for both military and law enforcement organizations. The proven battlefield success of night vision devices has produced a large number and an increasing availability of both new and used military and consumer designed night vision devices. Consequently, it is easy for criminal organizations and individuals to obtain and use night vision devices against law enforcement agencies, fire departments or other public supported groups that may or may not have such devices. The safety of people in these groups is compromised by the availability of night vision devices to criminals and criminal organizations or groups.

In military situations, virtually all armies that are equipped even moderately well have and use night vision devices regularly. Paramilitary organizations or groups, terrorists and subversives can obtain night vision devices on secondary markets with relative ease. The potential for misuse of night vision devices against law enforcement and fire departments or against friendly military organizations is high. The ability to conduct surveillance or other operations against criminals, subversives and other unfriendly groups is compromised by the availability of night vision or other vision enhancing or detecting equipment to the groups.

When viewed with night vision devices, certain surfaces are more readily detected than others are. A number of factors contribute to the detectability of an object, including the material composition, surface finishes, colors, reflectivity and various other factors. Articles made from many different plastics are very visible when viewed with night vision devices. It has been found that many common hardware components, such as buckles, molded pack frames, weapon components and other plastic equipment pieces that are mission critical in both military and law enforcement engagements are seen readily with night vision devices. Consequently, even if clothing or other surrounding materials is treated to reduce visibility through night vision devices, a buckle, weapon or other article or component can reveal the location of an otherwise camouflaged and hidden individual.

Therefore, it is desirable to provide surface attributes on articles and components thereof that will reduce the visibility and signal of night vision devices, infrared devices and ultraviolet viewing devices. Also, the reduction of glare and flashing caused by reflected light is an advantageous attribute for surfaces of equipment used by police, the military and other organizations.

SUMMARY OF THE INVENTION

The present invention meets the above-identified needs by providing a three-dimensional surface configuration that causes inconsistent reflectivity and varied angles of incidence and reflectivity when exposed to light sources.

In one form thereof, the present invention provides a body having a surface configuration for diffusing reflected light The surface configuration has an outer surface of minimal surface area and an inner surface spaced from the outer surface. Closely adjacent walls between the outer surface and the inner surface define with the inner surface a plurality of enclosed cells open at the outer surface. The walls are disposed at differing angles with respect to the outer ends inner surfaces for providing inconsistent and varied surface reflectivity by providing varied angles of incidence and varied angles of reflectivity when exposed to light. Projections from the inner surface are within at least some of the enclosed spaces. The projections also provide inconsistent and varied surface reflectivity by providing varied angles of incidence and varied angles of reflectivity when exposed to light.

In another form thereof, the present invention provides a surface configuration for diffusing reflected light, with an inner surface and an outer surface spaced from one another. A wall structure between the inner surface and the outer surface defines laterally enclosed cells open at the outer surface. Projections are provided from the inner surface within at least some of the cells, the projections having distal edges.

In still another form thereof, the present invention provides a method for reducing the detectability of an object by night vision devices. The method has steps of providing on the object a three dimensional surface configuration including a plurality of individual formations defining an inner surface and an outer surface; creating each formation to form an enclosed cell open at the outer surface, including forming a wall between the inner and outer surfaces to have differing angles with respect to a light source; and forming a projection from the inner surface within the cells.

An advantage of the present invention is providing a surface treatment for articles and things that reduces detection by night vision devices, infrared and ultraviolet viewing devices.

Another advantage of the present invention is providing a surface treatment that reduces glare and flashing caused by reflected light.

Still another advantage of the present invention is providing a surface that is easy to manufacture into articles during molding of the article.

A further advantage of the present invention is providing a detection-limiting surface that can be made as a discrete body attachable to other articles to modify existing devices to become less visible.

A still further advantage of the present invention is providing a vision-reducing surface that reduces visibility in the 300 nanometer to 3,000 nanometer wavelength range.

Other features and advantages of the invention will become apparent to those skilled in the art upon review of the following detailed description, claims and drawings in which like numerals are used to designate like features.

Figure 1:
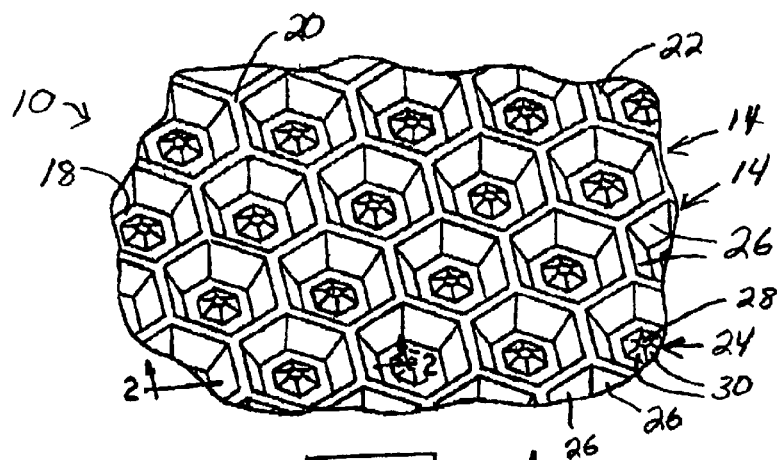
FIG. 1 is a perspective view of a first embodiment of a surface in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 3:
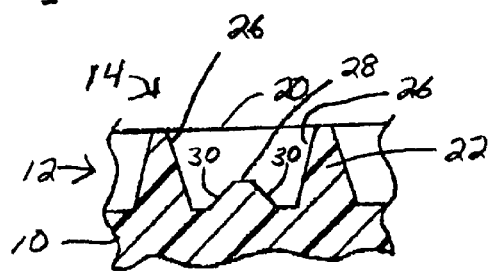
FIG. 3 is a cross-sectional view similar to that of FIG. 2 but of a modified form of the first embodiment.

Referring now more specifically to the drawings and to FIG. 1 in particular, a device or body 10 is shown having a surface configuration according to the present invention. The surface configuration includes a plurality of formations 14 closely packed on body 10. Only some formations 14 and the components thereof to be described hereinafter, and not all formations 14 or the components thereof are labeled in FIG. 1 for purposes of clarity Body 10 can be made of a variety of materials, including plastics for which the present invention is applied easily. In plastic articles, surface configurations 14 can be formed during molding of an article or thing made of the plastic, such as a buckle for a strap, a frame piece of a backpack, plastic components of weapons or tools or other articles manufactured by any of various molding processes. A mold for the plastic article can be shaped to include surface formations 14 in forms to be described hereinafter. In such devices and things, surface configuration 12 becomes an integral feature of the outer surface of the device or thing, or the part thereof including body 10, as shown in FIG. 3. In one embodiment, the plastic material can be a resin compound that is specifically formulated by the inclusion of light absorbing and/or reflecting dyes. The resin compound can be a mixture of polymeric resin, dyes and colorant, and the compound can be used to mold the various articles mentioned herein according to the principles of the present invention.

Figure 2:
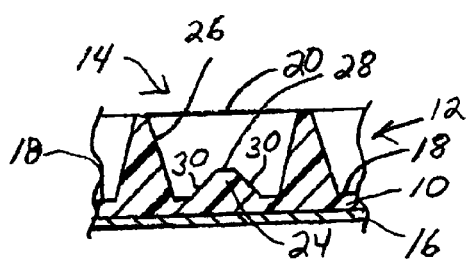
FIG. 2 is a cross-sectional view of the surface shown in FIG. 1, taken along line 2—2 of FIG. 1.

Alternatively, as seen best in FIG. 2, surface configuration 12 can be formed on one face of a relatively thin, discrete body 10. Thereafter, adhesive 16 can be used in a layer on an opposite face of body 10 to attach body 10 to another article. In this way, the present invention can be used not only as a surface on newly manufactured devices by molding it into the surface, the present invention also can be added or applied on surfaces of other things, which may or may not be made of plastic. Articles made of other materials can be rendered less visible to night vision devices by adhering a body 10 to the existing article or thing, the body 10 having surface configuration 12 on one face thereof. Further, panels of body 10 with surface configuration 12 can be placed so as to hide other things behind the panels.

Surface configuration 12 includes closely adjacent, three-dimensional formations 14 defining an inner surface 18 and an outer surface 20. Advantageously, inner surface 18 and outer surface 20 are spaced from each other by a significant distance, preferably by as much as available space and other design constraints allow in body 10. Individual formations 14 preferably are smaller rather than larger, and are more tightly arranged rather than more loosely arranged, for more thoroughly disrupting the reflected light from the object.

Formations 14 are configured and arranged to provide outer surface 20 with a small surface area relative to the size of body 10.

Each formation 14 includes a nested arrangement of an outer wall 22 and inner projection 24. The combination of nested features provides inconsistent reflectivity of light, reducing the clarity and distinctness by which the surface is detected with night vision devices, infrared devices, or ultraviolet devices.

In a preferred form, outer wall 22 is formed as a plurality of panels 26 between inner surface 18 and outer surface 20. Panels 26 define a laterally closed cell that is open at outer surface 20. Preferably, six panels 26 are provided to define hexagonal cells that can be tightly packed adjacent each other. Each panel 26 is wider at outer surface 20 than at inner surface 18 so that the exposed surface thereof angles inwardly in the cell defined thereby.

Inner projection 24 extends outwardly from inner surface 18 and has a distal end 28. Projection 24 preferably is shorter than outer wall 22, and distal end 28 is located between inner surface 18 and outer surface 20.

An advantageous form of inner projection 24, particularly useful with hexagonally shaped wall 22, is configured with a plurality of flat surfaces 30, preferably six flat surfaces 30. Projection 24 is wider at inner surface 18 than at distal end 28, tapering smoothly from inner surface 18 to distal end 28.

Figure 4:
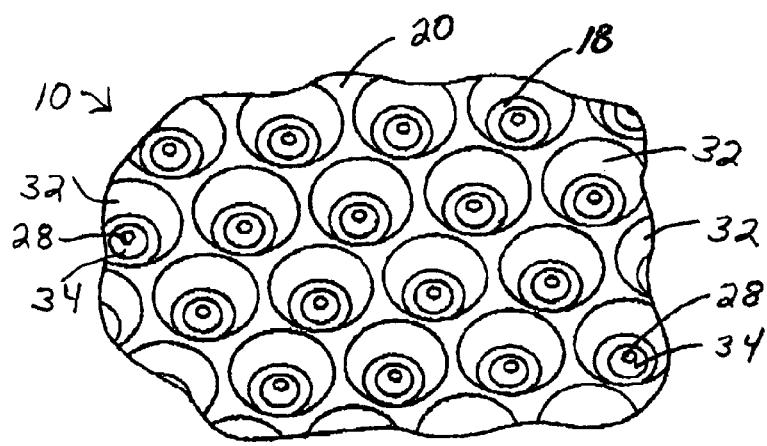
FIG. 4 is a perspective view of a further embodiment of the present invention.

Hexagonally shaped walls 22 and six-sided projections 24 are one preferred arrangement of surface configuration 12; however, other arrangements also can be used. For example, instead of being made of flat segments, wall 22 can be continuously curved. FIG. 4 illustrates an embodiment of the present invention in which a continuously curved wall 32 is round, and a projection 34 arranged therein is a frustum or truncated cone. In a preferred form, curved wall 32 is of greater diameter at outer surface 20 than at inner surface 18.

Other geometric arrangements are also believed to be suitable, if sufficiently closely arranged on the article or thing. To be suitable, the geometric arrangement includes surfaces arranged at various angles to provide inconsistent angles of incidence and reflection with respect to a light source shinning on the object. With each formation being relatively small, and with all formations being closely and compactly arranged, large expanses forming areas of consistent reflectivity are minimized, and the surface is less detectable to a variety of vision enhancing devices.

In the preferred embodiments shown and described herein, a projection 24 or 34 is shown within each wall 22 or 32. In some uses of the invention, it may be suitable to provide random or patterned arrangements in which not all walls 22 or 32 have a projection 24 or 34 contained there within. Further, combinations may be used in which a continuously curved wall 32 has a flat sided projection 24 therein, or a wall 22 made of flat panels 26 has a frusto-conical or other curved projection 34 therein.

The present invention can be combined with other light controlling features. For example, when used on plastic components, resin compounds can be formulated to include light absorbing and/or light reflecting dyes. Features such as these can be used to reduce visibility of an object within the range of between about 300 and 3000 nanometer wavelength.

Variations and modifications of the foregoing are within the scope of the present invention. It is understood that the invention disclosed and defined herein extends to all alternative combinations of two or more of the individual features mentioned or evident from the text and/or drawings.

All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A body having a surface configuration for diffusing reflected light, said surface configuration comprising:
    an outer surface of minimal surface area;
    an inner surface spaced from said outer surface;
    closely adjacent walls between said outer surface and said inner surface defining with said inner surface a plurality of enclosed cells open at said outer surface, said walls disposed at differing angles with respect to said surfaces for providing inconsistent and varied surface reflectivity by providing varied angles of incidence and varied angles of reflectivity when exposed to light; and
    projections from said inner surface within at least some of said enclosed spaces, said projections also providing inconsistent and varied surface reflectivity by providing varied angles of incidence and varied angles of reflectivity when exposed to light.

2. The body having a surface configuration of claim 1, said walls being continuously curved.

3. The body having a surface configuration of claim 2, said projections being frustums.

4. The body having a surface configuration of claim 2, said walls being cylindrical.

5. The body having a surface configuration of claim 4, said projections being frustums.

6. The body having a surface configuration of claim 1, said projections being frustums.

7. The body having a surface configuration of claim 1, said wall structures including panels defining hexagonally shaped cells.

8. The body having a surface configuration of claim 7, said panels being wider at said outer surface than at said inner surface.

9. The body having a surface configuration of claim 7, said panels angling inwardly in said chambers from said outer surface to said inner surface.

10. The body having a surface configuration of claim 9, said panels being wider at said outer surface than at said inner surface.

11. The body having a surface configuration of claim 10, said projections each having a plurality of flat surfaces and a distal end, said flat surfaces being wider at said inner surface than at said distal end.

12. The body having a surface configuration of claim 11, said projections having six said surfaces.

13. The body having a surface configuration of claim 1, said projections each having a plurality of flat surfaces and a distal end, said flat surfaces being wider at said inner surface than at said distal end.

14. The body having a surface configuration of claim 13, said projections having six said surfaces.

15. The body having a surface configuration of claim 1, said configuration being on a first side of said body, and said body having adhesive on a second side thereof for attaching said body to an object.

16. The body of claim 1, said surface configuration being a mixture including a resin compound and light absorbing and/or reflecting dyes, said mixture being formed by molding.

17. A surface configuration for diffusing reflected light, said surface configuration comprising:
    an inner surface and an outer surface spaced from one another;
    a wall structure between said inner surface and said outer surface, said wall structure defining laterally enclosed cells open at said outer surface; and
    a projection from said inner surface within at least some of said cells, said projections having distal edges.

18. The surface configuration of claim 17, said distal edges of said projections being between said inner and outer surfaces.

19. The surface configuration of claim 17, said projections being frustums.

20. The surface configuration of claim 17, said cells being round an inwardly tapered.

21. The surface configuration of claim 17, said cells being hexagonal.

22. The surface configuration of claim 17, said wall structure including panels wider at said outer surface than at said inner surface.

23. The surface configuration of claim 17, said wall structure including panels defining each said cell, said panels angling inwardly in said cells from said outer surface to said inner surface.

24. The surface configuration of claim 17, said projections each having a plurality of flat surfaces wider at said inner surface and at said distal edge thereof.

25. A method for reducing the detectability of an object by night vision devices, said method comprising the steps of:
    providing on the object a three dimensional surface configuration including a plurality of individual formations defining an inner surface and an outer surface;
    creating each formation to form an enclosed cell open at the outer surface, including forming a wall between the inner and outer surfaces to have differing angles with respect to a light source; and
    forming a projection from the inner surface within the cells.

26. The method of claim 25, including molding the surface configuration integrally with the object while molding the object.

27. The method of claim 25, including providing the surface configuration on a discrete body separate from the object, and attaching the body to the object.

* * * * *